(12) United States Patent
Nakamura

(10) Patent No.: US 8,607,113 B2
(45) Date of Patent: Dec. 10, 2013

(54) DATA PROCESSING APPARATUS, AND CONTROL METHOD AND STORAGE MEDIUM THEREFOR

(75) Inventor: Tadahiro Nakamura, Yokohama (JP)

(73) Assignee: Canon Kabushiki Kaisha (JP)

(*) Notice: Subject to any disclaimer, the term of this patent is extended or adjusted under 35 U.S.C. 154(b) by 372 days.

(21) Appl. No.: 12/850,277

(22) Filed: Aug. 4, 2010

(65) Prior Publication Data

US 2011/0035640 A1   Feb. 10, 2011

(30) Foreign Application Priority Data

Aug. 4, 2009  (JP) .................................. 2009-181516

(51) Int. Cl.
*G08C 25/02*   (2006.01)

(52) U.S. Cl.
USPC .............................. 714/748; 714/43; 358/1.14

(58) Field of Classification Search
USPC .......................... 714/43, 748; 358/1.14, 1.15
See application file for complete search history.

(56) References Cited

U.S. PATENT DOCUMENTS

| | | | |
|---|---|---|---|
| 7,301,658 B2* | 11/2007 | Henry | 358/1.15 |
| 7,461,300 B2* | 12/2008 | Tanaka et al. | 714/43 |
| 7,855,795 B2* | 12/2010 | Ueda et al. | 358/1.14 |
| 8,081,332 B2* | 12/2011 | Nagarajan et al. | 358/1.15 |
| 8,149,443 B2* | 4/2012 | Shouno | 358/1.15 |
| 2003/0164990 A1* | 9/2003 | Watanabe | 358/402 |
| 2006/0224727 A1* | 10/2006 | Kumakura et al. | 709/224 |
| 2009/0235111 A1* | 9/2009 | Suzuki | 714/4 |

FOREIGN PATENT DOCUMENTS

JP   2001-274806 A   10/2001

* cited by examiner

*Primary Examiner* — Philip Guyton
(74) *Attorney, Agent, or Firm* — Rossi, Kimms & McDowell LLP

(57) ABSTRACT

A data processing apparatus capable of efficiently collecting information useful for network failure analysis. If image data transmission to a host computer has failed, a packet acquisition start instruction is given from a data transmission control unit to a packet acquisition control unit. Subsequently, image data is retransmitted to the host computer. After completion of the image data retransmission, a packet acquisition termination instruction is given to the packet acquisition control unit.

7 Claims, 15 Drawing Sheets

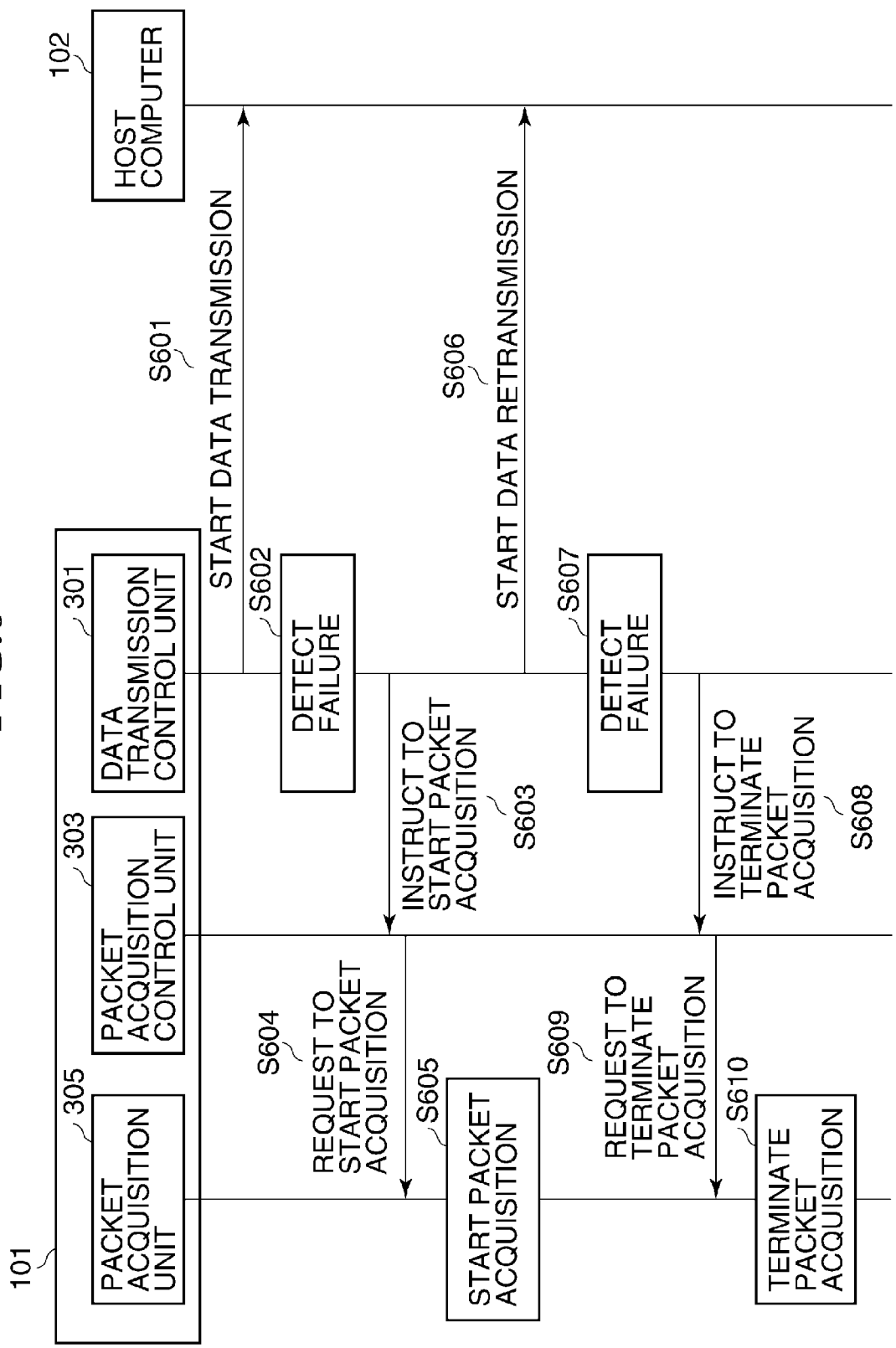

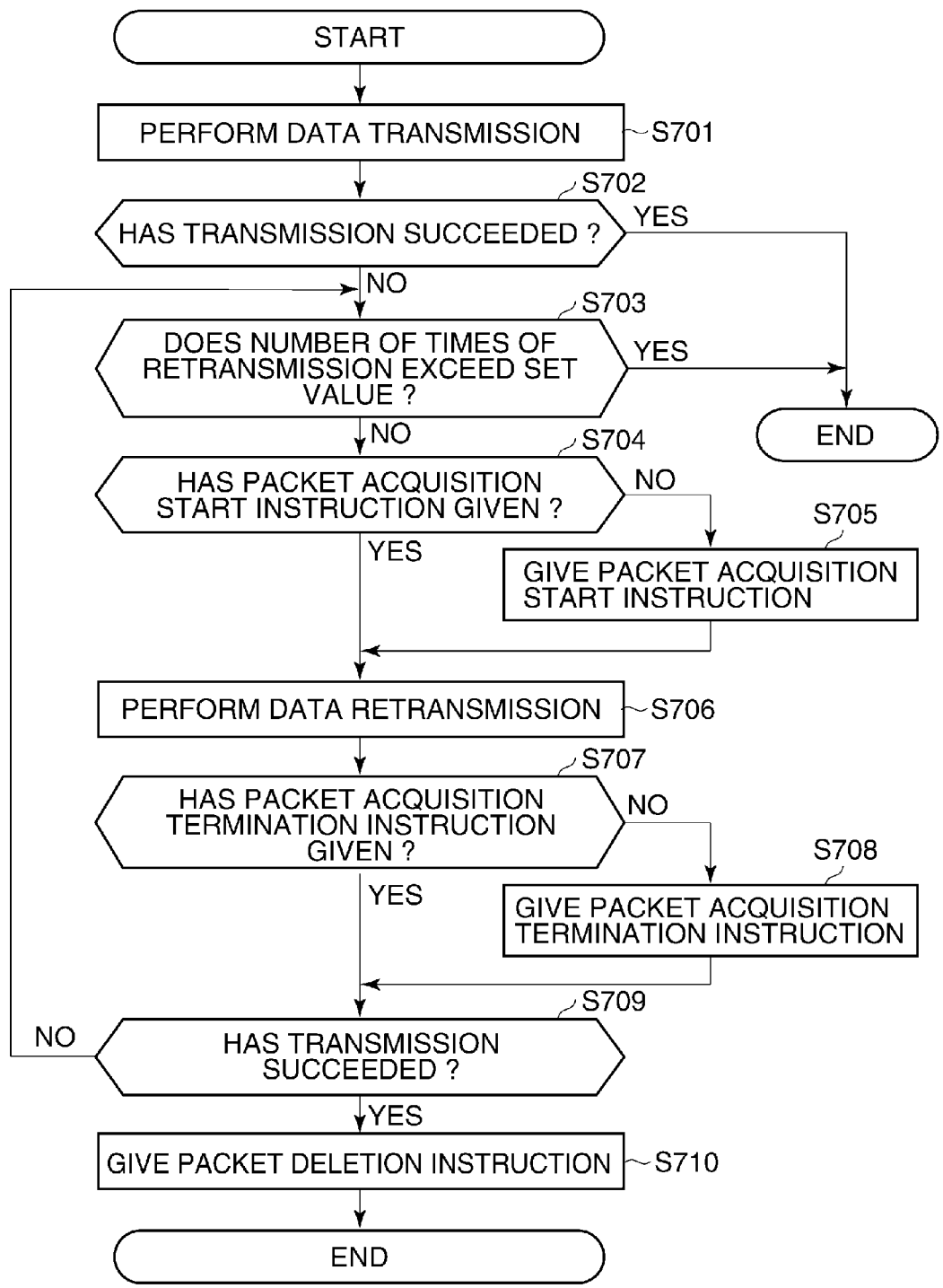

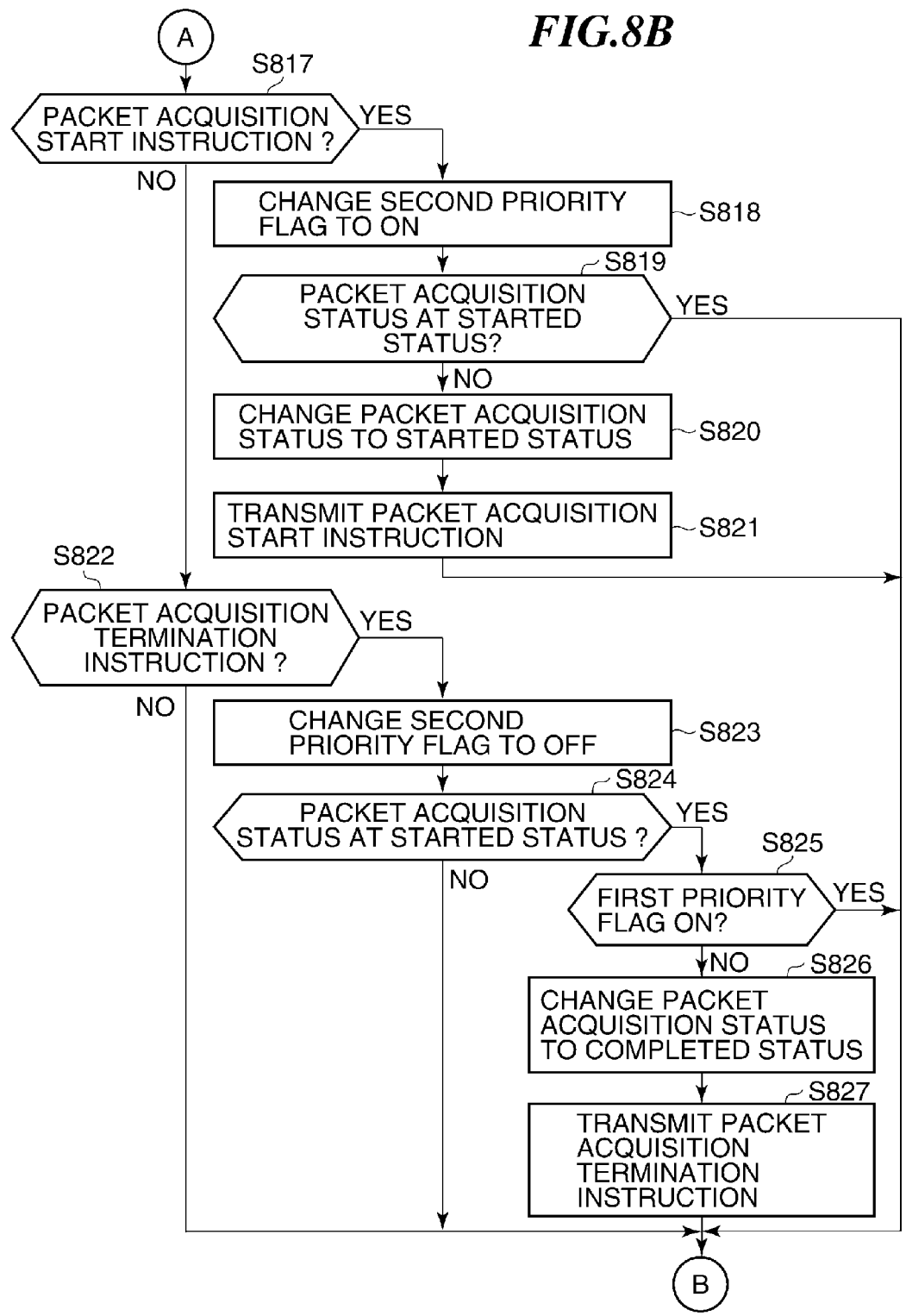

*FIG.10*

| 1000 | 1001 | 1002 |
|---|---|---|
| PACKET ACQUISITION STATUS | FIRST PRIORITY FLAG | SECOND PRIORITY FLAG |
| COMPLETED | OFF | OFF |

DATA PROCESSING APPARATUS, AND CONTROL METHOD AND STORAGE MEDIUM THEREFOR

BACKGROUND OF THE INVENTION

1. Field of the Invention

The present invention relates to a data processing apparatus capable of communicating with an information processing apparatus via a network and acquiring packets flowing through the network, and relates to a control method for the data processing apparatus and a storage medium storing a program for executing the control method.

2. Description of the Related Art

In recent years, various devices such as information processing apparatuses (e.g., personal computers (PCs)) and data processing apparatuses (e.g., copying machines and printers) are connected to an enterprise network, and the number of devices continues to increase. In addition, different networks are connected together. Thus, the scale of networks becomes larger. On the other hand, once a network failure occurs, there is a fear that a large number of devices connected to the network are affected and business operations are disturbed.

The cause of network failure is multiple such as an erroneous setting of a device connected to the network and an excess traffic. Thus, upon occurrence of a network failure, it is necessary to promptly locate the cause of the network failure and take an appropriate countermeasure. As effective means for locating the cause of network failure, it is generally known to acquire network packets and analyze the content thereof.

Heretofore, to acquire network packets, a dedicated PC must be connected to a network considered to have trouble and packet acquisition software must be executed on the PC. In recent years, however, some data processing apparatus has a packet acquisition function and is able to acquire and hold communication packets flowing through a network.

For example, Japanese Laid-open Patent Publication No. 2001-274806 discloses a technique of using a packet acquisition function of a data processing apparatus to acquire packets flowing through a network during a given time period, analyzing the acquired packets, and making a network setting of the data processing apparatus based on an analysis result.

As described above, it is known to use a data processing apparatus to acquire packets flowing through a network for a given time period or at a timing set by a user. With the packet acquisition of this type, it is unnecessary to provide and connect to a network a PC dedicated for packet acquisition to identify the cause of network failure relating to the data processing apparatus (e.g., a copying machine) such as a printing speed reduction, thereby making it possible to reduce the effort for investigation of the cause of network failure.

However, the conventional data processing apparatus having a packet acquisition function has a problem that it is difficult to acquire packets at an appropriate timing upon occurrence of a network failure relating to the data processing apparatus.

For example, in the case of a network failure where transmission of an image obtained by scanning an original from the data processing apparatus to a server on the network occasionally fails, image transmission can sometimes be performed successfully when the data processing apparatus acquires packets for investigation of the cause of the network failure. In that case, the cause of such occasional network failure cannot be identified.

To obviate this, it appears possible to continue the packet acquisition by the data processing apparatus until a network failure occurs. In that case, however, problems are posed that heavy load is applied to a CPU of the data processing apparatus, a large-capacity memory resource (hard disk) is required, the memory resource is consumed wastefully, and the ordinary operation of the data processing apparatus is adversely affected.

SUMMARY OF THE INVENTION

The present invention provides a data processing apparatus capable of efficiently collecting information useful for network failure analysis, and provides a control method for the data processing apparatus and a storage medium storing a program for executing the control method.

According to a first aspect of this invention, there is provided a data processing apparatus able to communicate with an information processing apparatus via a network, which comprises an acquisition unit configured to acquire packets flowing through the network, a retransmission unit configured to perform data retransmission in a case where data transmission to the information processing apparatus via the network has failed, a control unit configured to cause the acquisition unit to start acquiring packets, and a setting unit configured to set a number of times the data retransmission can be performed by the retransmission unit, and wherein the data retransmission is performed a number of times not more than the number of times set by the setting unit, and the acquisition unit acquires packets at least when any of data retransmissions is performed.

According to a second aspect of this invention, there is provided a control method for a data processing apparatus able to communicate with an information processing apparatus via a network, which comprises an acquisition step of acquiring packets flowing through the network, a retransmission step of performing data retransmission in a case where data transmission to the information processing apparatus via the network has failed, a control step of starting packet acquisition in the acquisition step, and a setting step of setting a number of times the data retransmission can be performed in the retransmission step, and wherein the data retransmission is performed a number of times not more than the number of times set in the setting step, and packets are acquired in the acquisition step at least when any of data retransmissions is performed.

According to a third aspect of this invention, there is provided a non-transitory computer-readable storage medium storing a program for causing a computer to execute the control method according to the second aspect of this invention.

With the present invention, if data transmission from the data processing apparatus to the information processing apparatus has failed, packets are acquired when data is retransmitted, thereby making it possible to efficiently collect information useful for network failure analysis.

Further features of the present invention will become apparent from the following description of exemplary embodiments with reference to the attached drawings.

BRIEF DESCRIPTION OF THE DRAWINGS

FIG. 6 is a sequence diagram showing a process performed by the image forming apparatus when image data transmission has failed;

FIG. 7 is a flowchart showing a process performed by a data transmission control unit of the image forming apparatus;

FIGS. 8A and 8B are a flowchart showing a process performed by a packet acquisition control unit of the image forming apparatus;

FIG. 10 is a view showing the construction of an internal table used by the packet acquisition control unit to control the packet acquisition unit;

DETAILED DESCRIPTION OF THE PREFERRED EMBODIMENTS

The present invention will now be described in detail below with reference to the drawings showing preferred embodiments thereof.

First Embodiment

Figure 1:
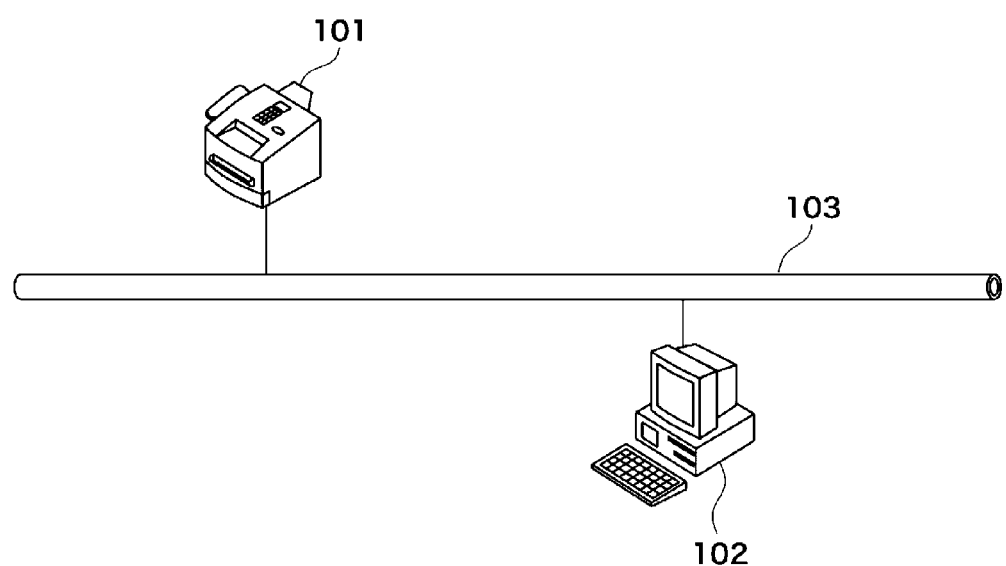
FIG. 1 is a schematic view showing the construction of a network system to which an image forming apparatus according to a first embodiment of this invention is connected.

FIG. 1 schematically shows the construction of a network system to which an image forming apparatus according a first embodiment of this invention is connected.

As shown in FIG. 1, the network system is configured that an image forming apparatus 101 as an example of data processing apparatus and a host computer 102 as an example of information processing apparatus are connected with each other for communication via a network 103. The image forming apparatus 101 is configured as a multi-function peripheral having an original reading function, a printing function, and a function of transmitting image data read from an original to the host computer 102 via the network 103.

It should be noted that this embodiment shows an example arrangement where one image forming apparatus and one host computer are connected to the network, however, the type of data processing apparatus, the type of information processing apparatus, the number of data processing apparatuses connected to the network, and the number of information processing apparatuses connected to the network are not limited to the illustrated example.

Figure 2:
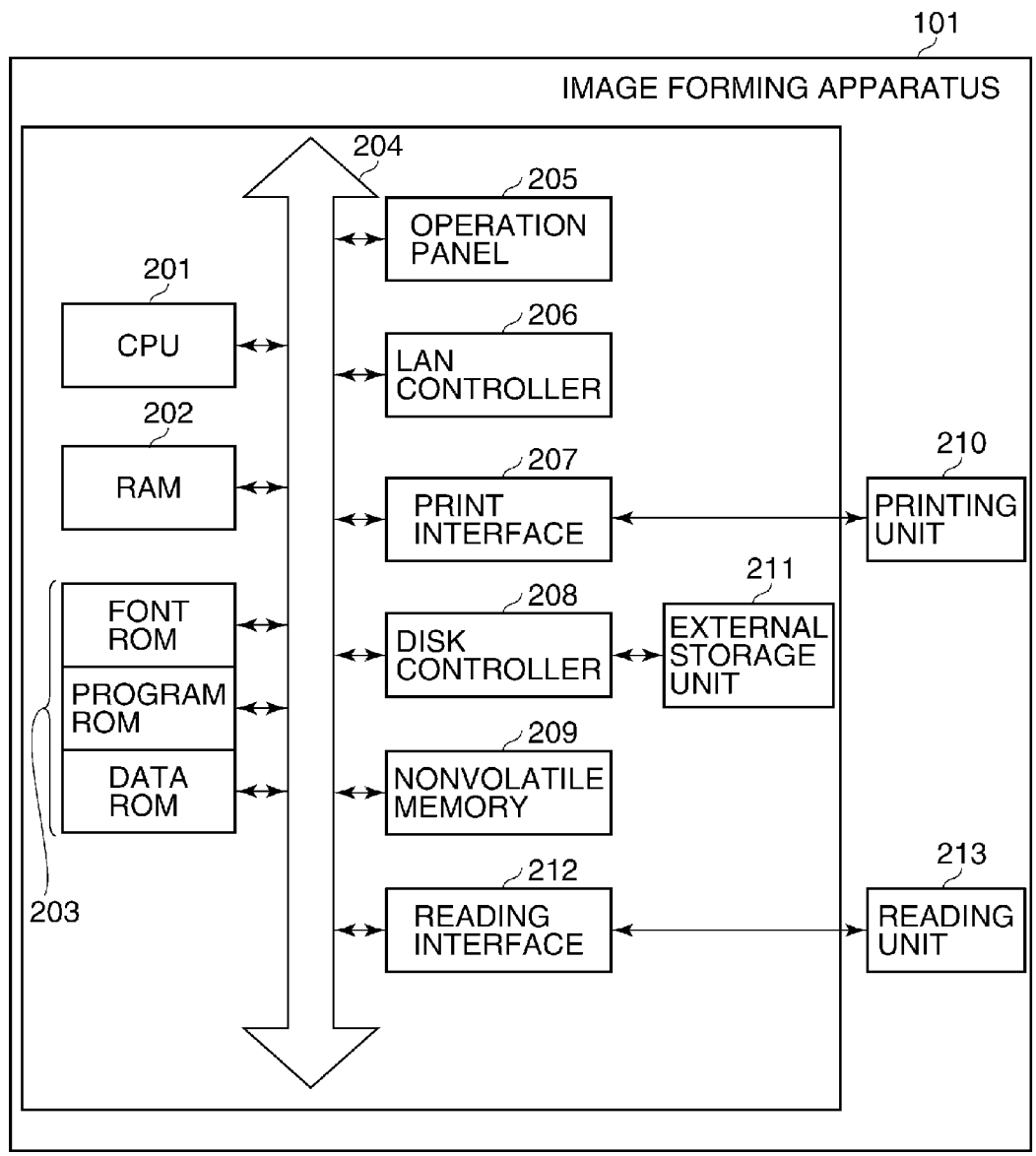
FIG. 2 is a block diagram showing the hardware construction of the image forming apparatus.

FIG. 2 shows in block diagram the hardware construction of the image forming apparatus 101.

As shown in FIG. 2, the image forming apparatus 101 includes a CPU 201, RAM 202, ROM 203, system bus 204, operation panel 205, LAN controller 206, print interface 207, disk controller 208, nonvolatile memory 209, printing unit (printer engine) 210, external storage unit 211, reading interface 212, and reading unit (scanner) 213.

The CPU 201 performs overall control of various devices connected to the system bus 204 based on a control program stored in a program ROM of the ROM 203 or in the external storage unit 211. The CPU 201 outputs image data (image signal) as output information to the printing unit 210 via the print interface 207, and performs processing on image data (image signal) input from the reading unit 213 via the reading interface 212. The CPU 201 performs processes shown in flowcharts described below based on the control program (program code). The CPU 201 is able to communicate via the LAN controller 206 with the host computer 102 and image forming apparatuses (not shown), other than the image forming apparatus 101, on the network 103.

The RAM 202 functions as a main memory and a work area for the CPU 201. The memory capacity of the RAM 202 can be expanded by means of an option RAM connected to an expansion port, not shown. It should be noted that the RAM 202 is also used as an output information developing region, an environment data storage region, etc.

The ROM 203 includes a font ROM, program ROM, and data ROM. The program ROM stores control programs executable by the CPU 201, the font ROM stores font data (including outline font data) used for generating the output information, and the data ROM stores information utilized by the image forming apparatus 101.

Figure 4:
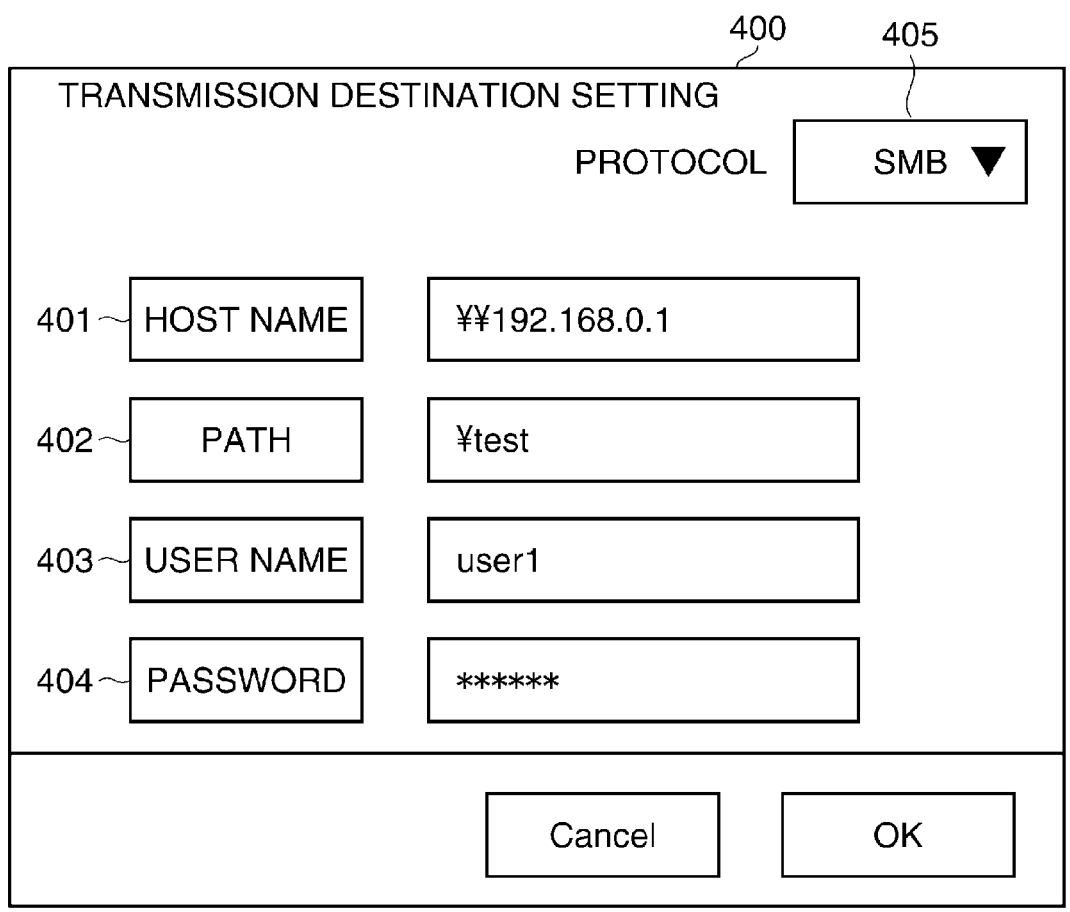
FIG. 4 is a view showing an example of a transmission destination setting screen displayed on an operation panel of the image forming apparatus.
Figure 5:
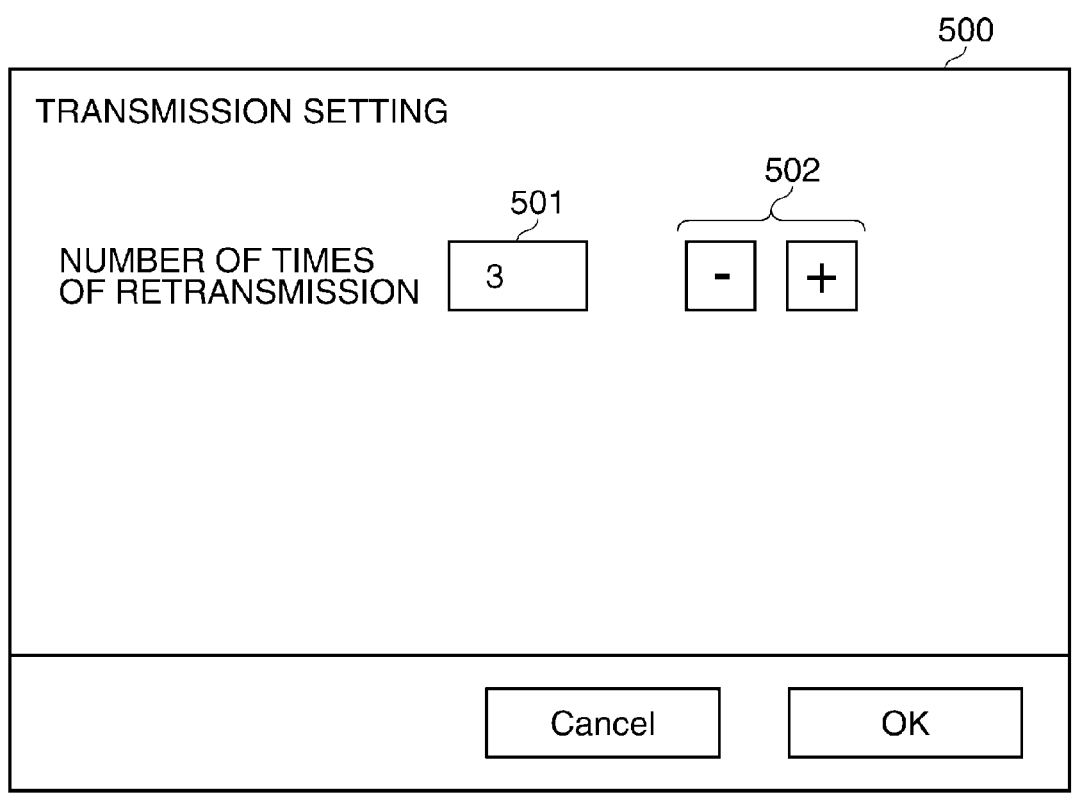
FIG. 5 is a view showing an example of a transmission setting screen displayed on the operation panel.

The operation panel 205 has software keys that enable a user to input various information, and a display unit for displaying various screens (including a transmission destination setting screen shown in FIG. 4 and a transmission setting screen shown in FIG. 5). The LAN controller 206 controls communication between the image forming apparatus 101 and the host computer 102 and between the apparatus 101 and other image forming apparatuses on the network 103. The print interface 207 provides an interface for the CPU 201 to output image data to the printing unit 210. The reading interface 212 provides an interface for the CPU 201 to input image data from the reading unit 213. The nonvolatile memory 209 stores various setting information set via the operation panel 205.

The external storage unit 211 is comprised of, e.g., a hard disk (HDD) or an IC card, and access to the storage unit 211 is controlled by a disk controller (DKC) 208. The external storage unit 211 stores font data, emulation program, form data, etc., and is used as a job storage region for temporarily spooling a print job to be print processed by the printing unit 210 so that the spooled print job can be controlled from the outside.

The external storage unit 211 holds, as BOX data, image data read from an original by the scanner 213 or image data for a print job. In other words, the external storage unit 211 is used as a BOX data storage region that stores BOX data so that the data can be referred to or printed from the network 103. It should be noted that the external storage unit 211 can be comprised of IC cards including an IC card that stores built-in font and option font, or can be comprised of external memories including an external memory that stores a program for interpreting printer control languages of different language system.

Although not illustrated, the image forming apparatus 101 can optionally be mounted with extension apparatuses (such as a finisher having stapling and sorting functions and an apparatus having a double-sided printing function). Operations of these apparatuses are controlled by the CPU 201.

Figure 3:
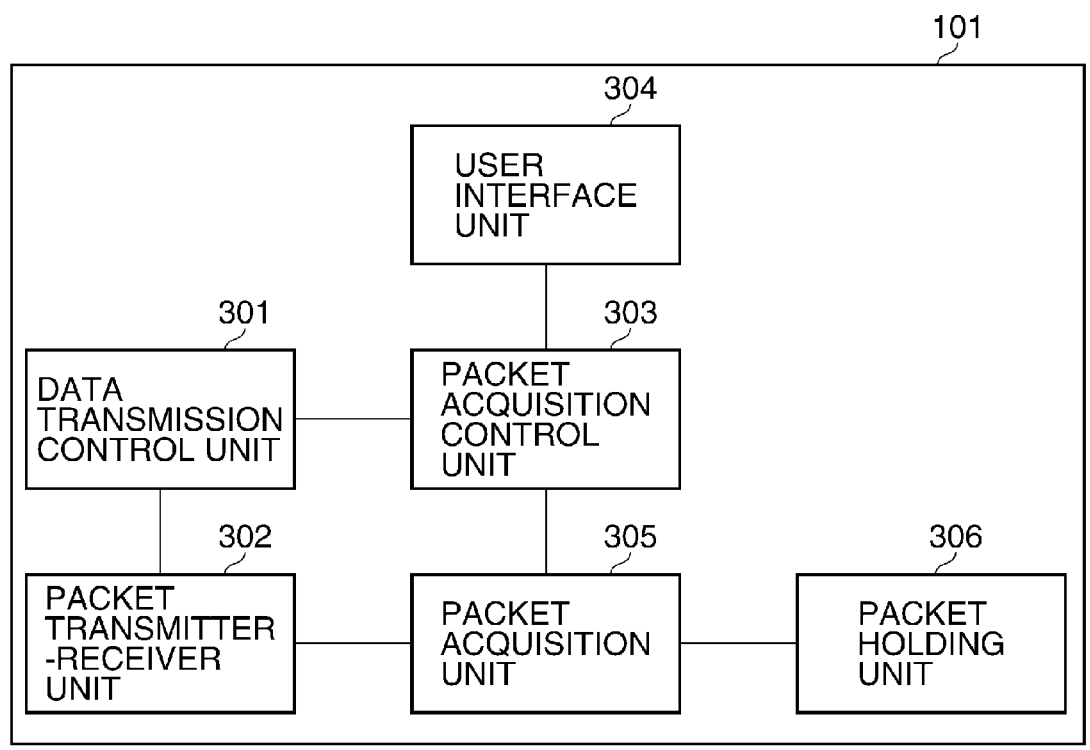
FIG. 3 is a block diagram showing the software construction of the image forming apparatus.

FIG. 3 shows the software construction of the image forming apparatus 101 in block diagram.

As shown in FIG. 3, the image forming apparatus 101 includes a data transmission control unit 301, packet transmitter-receiver unit 302, packet acquisition control unit 303, user interface (UI) unit 304, packet acquisition unit 305, and packet holding unit 306. All these software blocks are stored in the external storage unit 211 or in the program ROM of the ROM 203, and loaded as an executable program into the RAM 202 when the image forming apparatus 101 is activated. Subsequently, the software blocks are concurrently executed by the CPU 201.

The data transmission control unit 301 transmits image data input from the reading unit 213 to the host computer 102 via the packet transmitter-receiver unit 302 and the network 103, and instructs the packet acquisition control unit 303 to start or terminate packet acquisition. The packet transmitter-receiver unit 302 transmits and receives packets via the network 103.

The packet acquisition control unit 303 controls the packet acquisition unit 305 based on an internal table (see FIG. 10) under the control of the data transmission control unit 301 or in accordance with an instruction from the UI unit 304. The UI unit 304 provides an interface that accepts an operation on the operation panel 205 of the image forming apparatus 101 by a user or a service personnel. The packet holding unit 306 holds packet files.

The packet acquisition unit 305 acquires packets transmitted from and received by the packet transmitter-receiver unit 302 via the network 103 (i.e., packets flowing through the network), and causes the packet holding unit 306 to hold the acquired packets as a packet file. The packet acquisition unit 305 is able to acquire only packets matching a condition (e.g., an IP address of a transmission destination and a protocol) by performing packet acquisition with filter setting in which filtering is applied during the packet acquisition, or acquire all the packets flowing through the network during a predetermined time period by performing packet acquisition without filter setting in which filtering is not applied during the packet acquisition.

As described above, either packet acquisition with filter setting or packet acquisition without filter setting can be selected in this embodiment.

Specifically, in the case of a first retransmission after occurrence of failure of image data transmission from the image forming apparatus 101 to the host computer 102, packet acquisition with filter setting is performed taking account of the possibility that the original transmission has accidentally failed. On the other hand, in the case of a second retransmission after occurrence of failure of the first retransmission, packet acquisition without filter setting is performed taking account of the possibility that the original transmission has not accidentally failed but has failed due to the presence of an abnormality.

FIG. 4 shows an example of a transmission destination setting screen displayed on the display unit of the operation panel 205.

As shown in FIG. 4, a host name button 401, path button 402, user name button 403, password button 404, and protocol button 405 are displayed on the transmission destination setting screen 400 for setting transmission destination information for image data transmission. By pressing a desired one or ones of the buttons 401 to 405 on the screen 400, a desired one or ones of host name, path, user name, password, and protocol can be set as information required for image data transmission from the image forming apparatus 101 to the host computer 102.

The host name is, e.g., in the form of IP address, but is not limited thereto. If not in the form of IP address, an input host name is converted into an IP address using DNS (domain name system) or other means. As the protocol, SMB (server message block), FTP (file transfer protocol), WebDAV, or the like can be selected. When the protocol button 405 is depressed, a list of selectable protocols is displayed.

FIG. 5 shows an example of a transmission setting screen displayed on the display unit of the operation panel 205.

As shown in FIG. 5, a retransmission number of times button 501 and an increment and decrement button 502 are displayed on the transmission setting screen 500 for setting a maximum possible number of times retransmission can be performed after occurrence of failure of image data transmission from the image forming apparatus 101 to the host computer 102. By using the retransmission number of times button 501, the maximum possible number of times of image data retransmission is set beforehand on the transmission setting screen 500. The maximum possible number of times of retransmission can be increased and decreased by using the increment and decrement button 502.

Next, with reference to FIGS. 6 to 13, operation of the image forming apparatus 101 constructed as described above will be described.

FIG. 6 shows in sequence diagram a process performed by the image forming apparatus 101 when image data transmission has failed.

As shown in FIG. 6, the data transmission control unit 301 of the image forming apparatus 101 starts image data transmission to the host computer 102 (step S601). Subsequently, when detecting that a failure (NG) of the image data transmission to the host computer 102 has occurred for any reason (step S602), the data transmission control unit 301 instructs the packet acquisition control unit 303 to start packet acquisition (step S603). In response to this, the packet acquisition control unit 303 requests the packet acquisition unit 305 to start packet acquisition (step S604). Thus, the packet acquisition unit 305 starts packet acquisition (step S605).

Subsequently, the data transmission control unit 301 starts image data retransmission to the host computer 102 (step S606). When detecting again that a failure (NG) has occurred in the image data transmission to the host computer 102 (step S607), the data transmission control unit 301 instructs the packet acquisition control unit 303 to terminate the packet acquisition (step S608). In response to this, the packet acquisition control unit 303 requests the packet acquisition unit 305 to terminate the packet acquisition (step S609). Thus, the packet acquisition unit 305 terminates the packet acquisition (step S610).

FIG. 7 shows in flowchart a process performed by the data transmission control unit 301 of the image forming apparatus 101.

As shown in FIG. 7, the data transmission control unit 301 performs image data transmission to the host computer 102 (step S701), and determines whether the image data transmission to the host computer 102 has succeeded (step S702). If it is determined that the transmission has succeeded, the present process is completed. If it is determined that the transmission has failed, the data transmission control unit 301 determines whether the number of times of retransmission to the host computer 102 performed until the present time exceeds a predetermined set value (maximum possible number of times of retransmission) (step S703).

If it is determined in step S703 that the number of times of retransmission performed until the present time exceeds the set value, the present process is completed. If it is determined that the number of times of retransmission performed until the present time does not exceed the set value, the data transmission control unit 301 determines whether it has given a packet acquisition start instruction (step S704). If the answer to step S704 is YES, the flow proceeds to step S706. If the answer to step S704 is NO, the data transmission control unit 301 gives the packet acquisition control unit 303 a packet acquisition start instruction (step S705), and then proceeds to step S706.

In step S706, the data transmission control unit 301 performs image data retransmission to the host computer 102. Next, the transmission control unit 301 determines whether it has given a packet acquisition termination instruction during the current retransmission process (step S707). If the answer to step S707 is YES, the flow proceeds to step S709. If the answer to step S707 is NO, the data transmission control unit 301 gives the packet acquisition control unit 303 a packet acquisition termination instruction (step S708), and proceeds to step S709.

In step S709, the data transmission control unit 301 determines whether the image data retransmission to the host computer 102 in step S706 has succeeded. If the transmission has failed, the flow returns to step S703. If the transmission has succeeded, the data transmission control unit 301 gives the packet acquisition control unit 303 a packet deletion instruction (step S710), whereupon the present process is completed.

It should be noted that in step S705 the IP address of the transmission destination host computer and/or information representing the protocol used may be delivered together with the packet acquisition start instruction from the data transmission control unit 301 to the packet acquisition control unit 303, and in step S710 the packet deletion instruction may not be given so as not to delete packets but retain the packets in the packet holding unit 306.

FIG. 10 shows the construction of an internal table used by the packet acquisition control unit 303 to control the packet acquisition unit 305.

As shown in FIG. 10, the internal table includes a packet acquisition status 1000, a first priority flag 1001, and a second priority flag 1002. The packet acquisition status 1000 has two statuses, i.e., a "STARTED" status and a "COMPLETED" status, and is initially set to the "COMPLETED" status. The packet acquisition status 1000 is changed under the control of the data transmission control unit 301 or in accordance with an instruction from the UI unit 304.

The first priority flag 1001 has two values, i.e., ON and OFF, and is initially set to OFF. The first priority flag 1001 is changed according to an instruction from the data transmission control unit 301. The second priority flag 1002 has two values, i.e., ON and OFF, and is initially set to OFF. The second priority flag 1002 is changed according to an instruction from the UI unit 304. A description of how to change values of the packet acquisition status 1000, first priority flag 1001, and second priority flag 1002 will be given later.

Figure 8A:
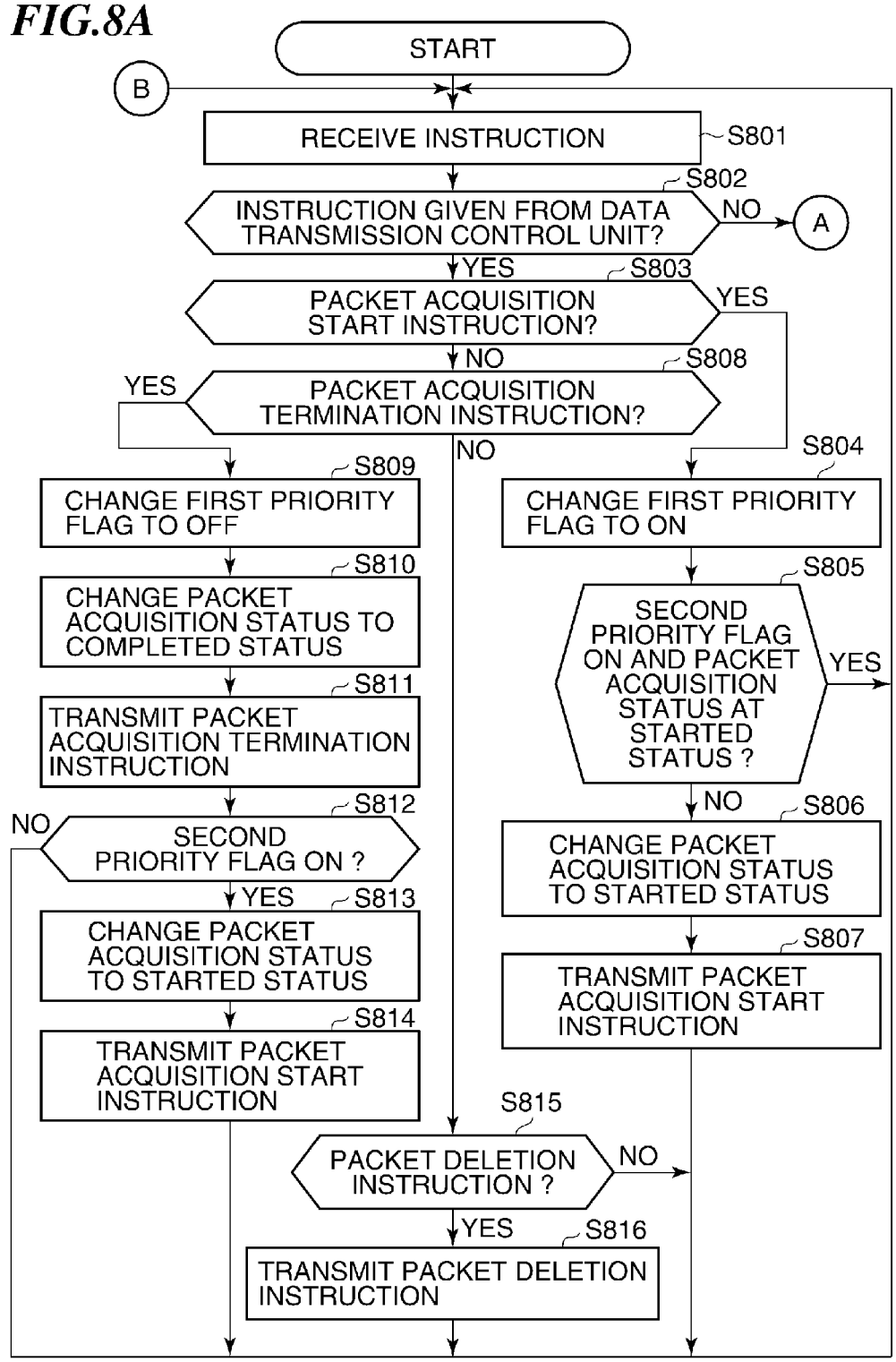

FIGS. 8A and 8B show in flowchart a process performed by the packet acquisition control unit 303.

As shown in FIG. 8A, the packet acquisition control unit 303 receives an instruction from the data transmission control unit 301 or from the UI unit 304 (step S801), and determines whether the received instruction has been given from the data transmission control unit 301 (step S802). If the received instruction has not been given from the data transmission control unit 301, the flow proceeds to step S817 shown in FIG. 8B. If the received instruction has been given from the data transmission control unit 301, the packet acquisition control unit 303 determines whether the received instruction is a packet acquisition start instruction (step S803).

If the received instruction is a packet acquisition start instruction, the packet acquisition control unit 303 changes the first priority flag 1001 in the internal table shown in FIG. 10 to ON (step S804), and determines whether the second priority flag 1002 in the internal table has a value of ON and the packet acquisition status 1000 is at the "STARTED" status (step S805).

If the answer to step S805 is YES, the flow returns to step S801. If the answer to step S805 is NO, the packet acquisition control unit 303 changes the packet acquisition status 1000 to the "STARTED" status (step S806), transmits a packet acquisition start instruction to the packet acquisition unit 305 (step S807), and returns to step S801.

If it is determined in step S803 that the received instruction is not a packet acquisition start instruction, the packet acquisition control unit 303 determines whether the received instruction is a packet acquisition termination instruction (step S808). If the received instruction is a packet acquisition termination instruction, the packet acquisition control unit 303 changes the first priority flag 1001 to OFF (step S809), changes the packet acquisition status 1000 to the "COMPLETED" status (step S810), and transmits a packet acquisition termination instruction to the packet acquisition unit 305 (step S811).

Next, the packet acquisition control unit 303 determines whether the second priority flag 1002 is ON (step S812). If the second priority flag 1002 is OFF, the flow returns to step S801. If the second priority flag 1002 is ON, the packet acquisition control unit 303 changes the packet acquisition status 1000 to the "STARTED" status (step S813), transmits a packet acquisition start instruction to the packet acquisition unit 305 (step S814), and returns to step S801.

If it is determined in step S808 that the received instruction is not a packet acquisition termination instruction, the packet acquisition control unit 303 determines whether the received instruction is a packet deletion instruction (step S815). If the received instruction is not a packet deletion instruction, the flow returns to step S801. If the received instruction is a packet deletion instruction, the packet acquisition control unit 303 transmits a packet deletion instruction to the packet acquisition unit 305 (step S816), and returns to step S801.

If it is determined in step S802 that the received instruction has not been given from the data transmission control unit 301 but from the UI unit 304, the packet acquisition control unit 303 determines whether the received instruction is a packet acquisition start instruction (step S817 in FIG. 8B). If the answer to step S817 is YES, the packet acquisition control unit 303 changes the second priority flag 1002 to ON (step S818), and determines whether the packet acquisition status 1000 is at the "STARTED" status (step S819). If the packet acquisition status 1000 is at the "STARTED" status, the flow returns to step S801. If the packet acquisition status 1000 is not at the "STARTED" status, the packet acquisition control unit 303 changes the packet acquisition status 1000 to the "STARTED" status (step S820), transmits a packet acquisition start instruction to the packet acquisition unit 305 (step S821), and then returns to step S801.

If it is determined in step S817 that the received instruction is not a packet acquisition start instruction, the packet acquisition control unit 303 determines whether the received instruction is a packet acquisition termination instruction (step S822). If the received instruction is not a packet acquisition termination instruction, the flow returns to step S801. On the other hand, if the received instruction is a packet acquisition termination instruction, the packet acquisition control unit 303 changes the second priority flag 1002 to OFF (step S823).

Next, the packet acquisition control unit 303 determines whether the packet acquisition status 1000 is at the "STARTED" status (step S824). If the packet acquisition status 1000 is not at the "STARTED" status, the flow returns to step S801. If the packet acquisition status 1000 is at the "STARTED" status, the packet acquisition control unit 303 determines whether the first priority flag 1001 is ON (step S825).

If the first priority flag 1001 is ON, the flow returns to step S801. If the first priority flag 1001 is not ON, the packet acquisition control unit 303 changes the packet acquisition status 1000 to the "COMPLETED" status (step S826), transmits a packet acquisition termination instruction to the packet acquisition unit 305 (step S827), and returns to step S801.

Figure 9:
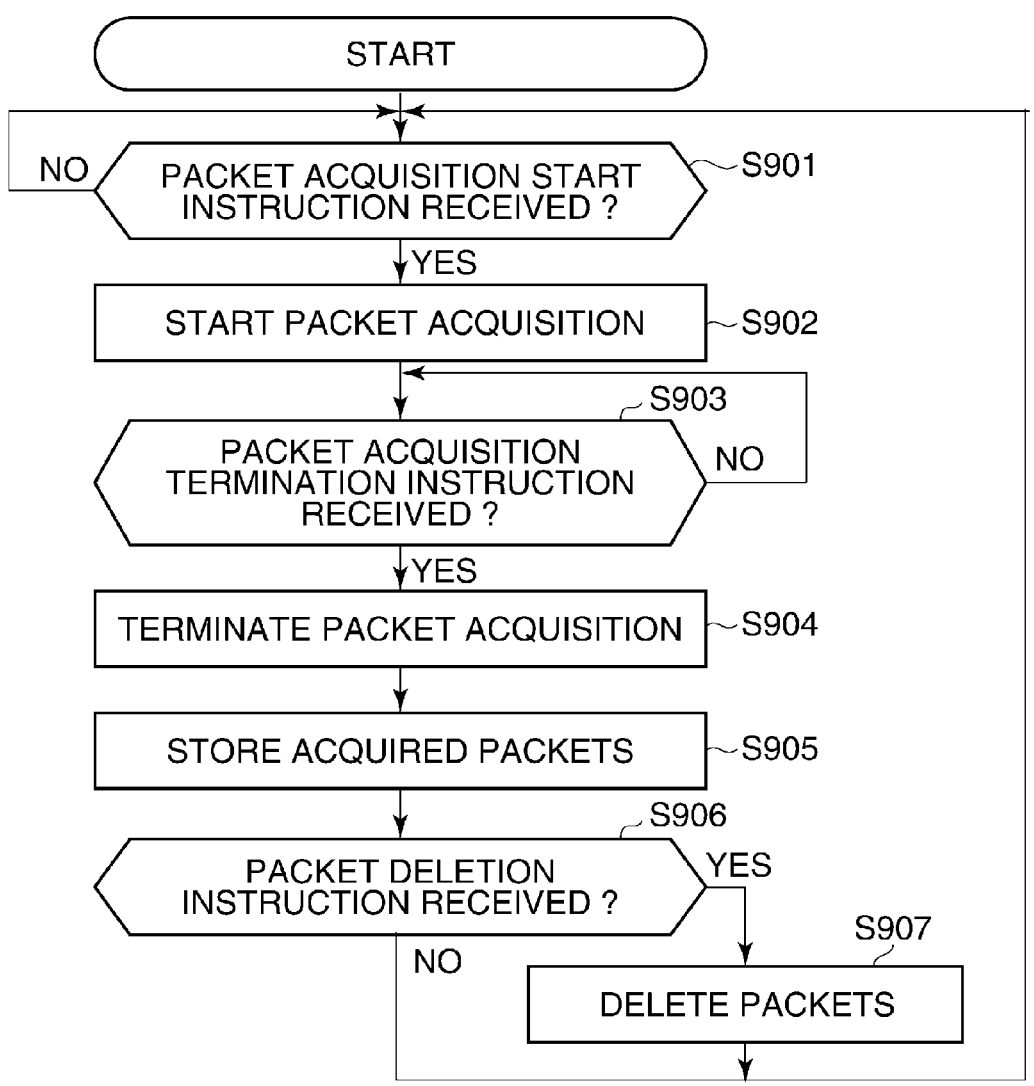
FIG. 9 is a flowchart showing a process performed by a packet acquisition unit of the image forming apparatus.

FIG. 9 shows in flowchart a process performed by the packet acquisition unit 305.

As shown in FIG. 9, the packet acquisition unit 305 waits for reception of a packet acquisition start instruction from the packet acquisition control unit 303 (step S901). When receiving a packet acquisition start instruction, the packet acquisition unit 305 starts acquiring packets (step S902) and determines whether it receives a packet acquisition termination instruction from the packet acquisition control unit 303 (step S903). When receiving a packet acquisition termination instruction (YES to step S903), the packet acquisition unit 305 terminates the packet acquisition (step S904) and causes the packet holding unit 306 to store the acquired packets (step S905).

Next, the packet acquisition unit 305 determines whether it receives a packet deletion instruction from the packet acquisition control unit 303 (step S906). When receiving a packet deletion instruction, the packet acquisition unit 305 causes the packet holding unit 306 to delete the stored packets (step S907), and returns to step S901. When the packet acquisition unit 305 does not receive the packet deletion instruction, the flow returns to step S901.

Figure 11:
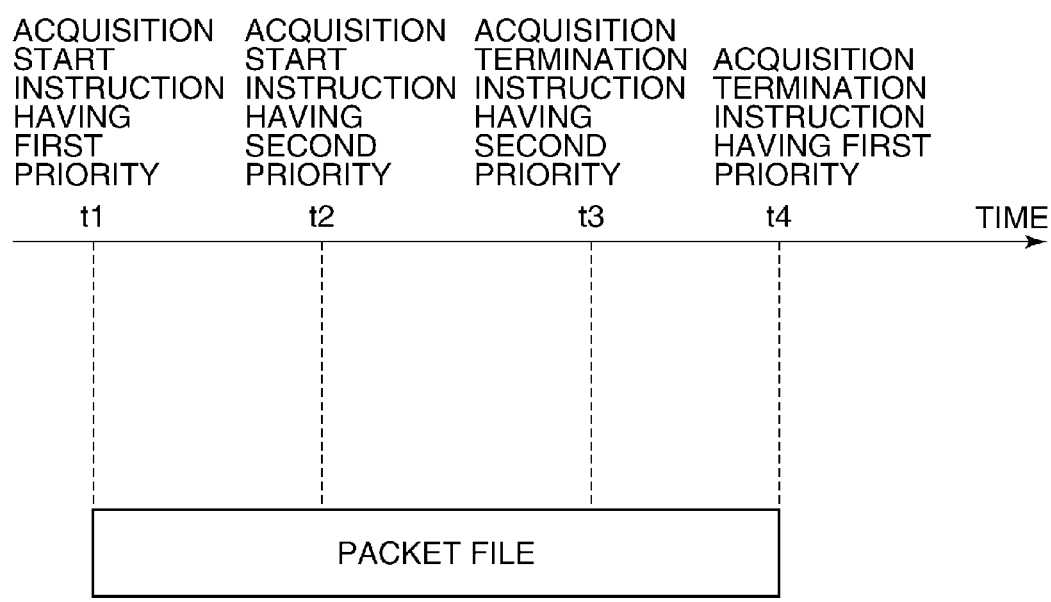
FIG. 11 is a view showing a process performed by the image forming apparatus in a case where packet acquisition start instructions having first and second priorities and packet acquisition termination instructions having first and second priorities are given.

FIG. 11 shows a process performed by the image forming apparatus 101 in a case where a packet acquisition start instruction having first priority, a packet acquisition start instruction having second priority, a packet acquisition termination instruction having second priority, and a packet acquisition termination instruction having first priority are given in this order.

As previously described with reference to the flowchart of FIGS. 8A and 8B, a packet acquisition start instruction given by the data transmission control unit 301 is assigned the first priority. On the other hand, when a service personnel manually operates the operation panel 205 to instruct packet acquisition for usual maintenance of the image forming apparatus or for analysis of the cause of failure, a packet acquisition start instruction is issued by the UI unit 304 and assigned the second priority. The packet acquisition start instruction given by the data transmission control unit 301 and having the first priority is processed preferentially to the packet acquisition start instruction given by the UI unit 304 and having the second priority.

In the example shown in FIG. 11, a packet acquisition start instruction having first priority is given at time t1, whereby packet acquisition is started. Subsequently, a packet acquisition instruction having second priority is given at time t2, but does not affect the already started packet acquisition with first priority. At time t3, a packet acquisition termination instruction having second priority is given but does not terminate the packet acquisition which is being performed with first priority. When a packet acquisition termination instruction having first priority is given at time t4, the packet acquisition is terminated and a packet file is stored in the packet holding unit 306.

Figure 12:
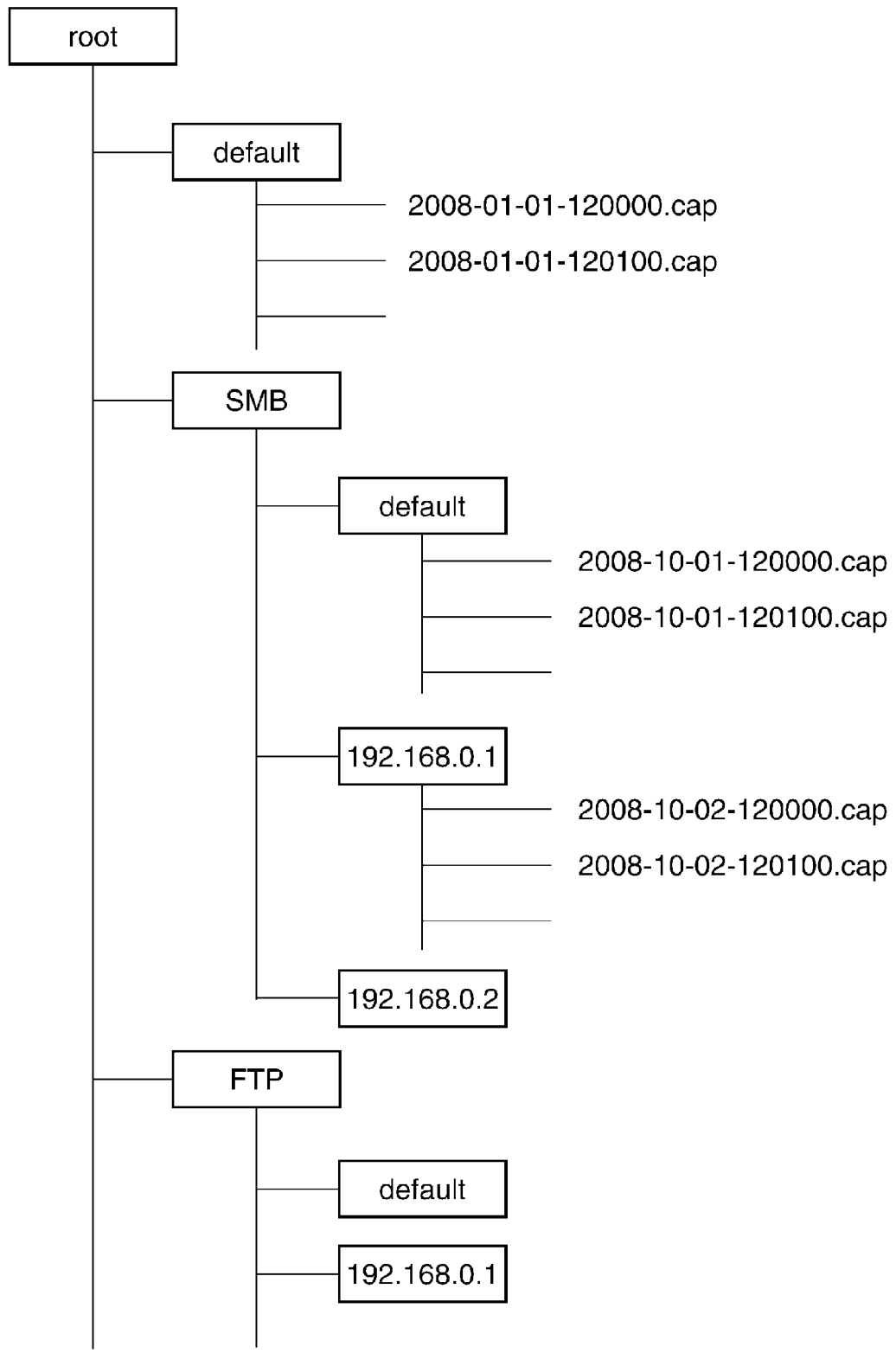
FIG. 12 is a view showing a hierarchy structure in which packet files are held by a packet holding unit of the image forming apparatus.

FIG. 12 shows a hierarchy structure in which packet files are held by the packet holding unit 306.

As shown in FIG. 12, the most significant directory in the hierarchy is a root directory under which subdirectories (default directory, SMB directory, and FTP directory) are created. In the case of packet acquisition without filter setting, a packet file is held under the default directory. It should be noted that packet acquisition time is set as a file name of a corresponding packet file, so that file names do not duplicate one another. In the case of packet acquisition with filter setting, a subdirectory is created on a per protocol basis and on a per destination IP address basis, and a packet file is held under a corresponding subdirectory.

According to the first embodiment, in a case where image data transmission from the image forming apparatus 101 to the host computer 102 has failed, packets flowing through the network are acquired at timing where image data retransmission is performed. It is therefore possible to acquire communication packets at the time of data retransmission from the image forming apparatus 101 to the host computer 102, whereby information useful for network failure analysis can efficiently be collected.

Second Embodiment

A second embodiment of this invention is basically the same as the first embodiment (FIGS. 1 to 3), and therefore only different points will be described below.

In this embodiment, packet acquisition with or without filter setting is performed at each image data retransmission in a case where the maximum possible number of times of retransmission from the image forming apparatus to a transmission destination is set to a plural number of times.

In a case that packets are acquired by packet acquisition with filter setting, the size of the acquired packets is small and therefore the content of the packets can easily be analyzed. On the other hand, if packet information removed by the filtering is required to analyze the cause of failure of image data transmission, it is necessary to relax the filtering condition or perform packet acquisition without filter setting.

In this embodiment, packet acquisition with filter setting is performed at any of a first to a predetermined N-th data retransmission (e.g., the first data retransmission in the case of N=1) and analysis is performed based on acquired packets which are small in size. On the other hand, packet acquisition with relaxed filter setting (e.g., packet acquisition without filter setting) is performed, if further packet information is necessary, i.e., at any of the predetermined (N+1)-th and subsequent data retransmissions (e.g., at the second data retransmission), and then analysis is performed based on acquired packets. As a result, the analysis can efficiently be carried out as a whole.

Figure 13A:
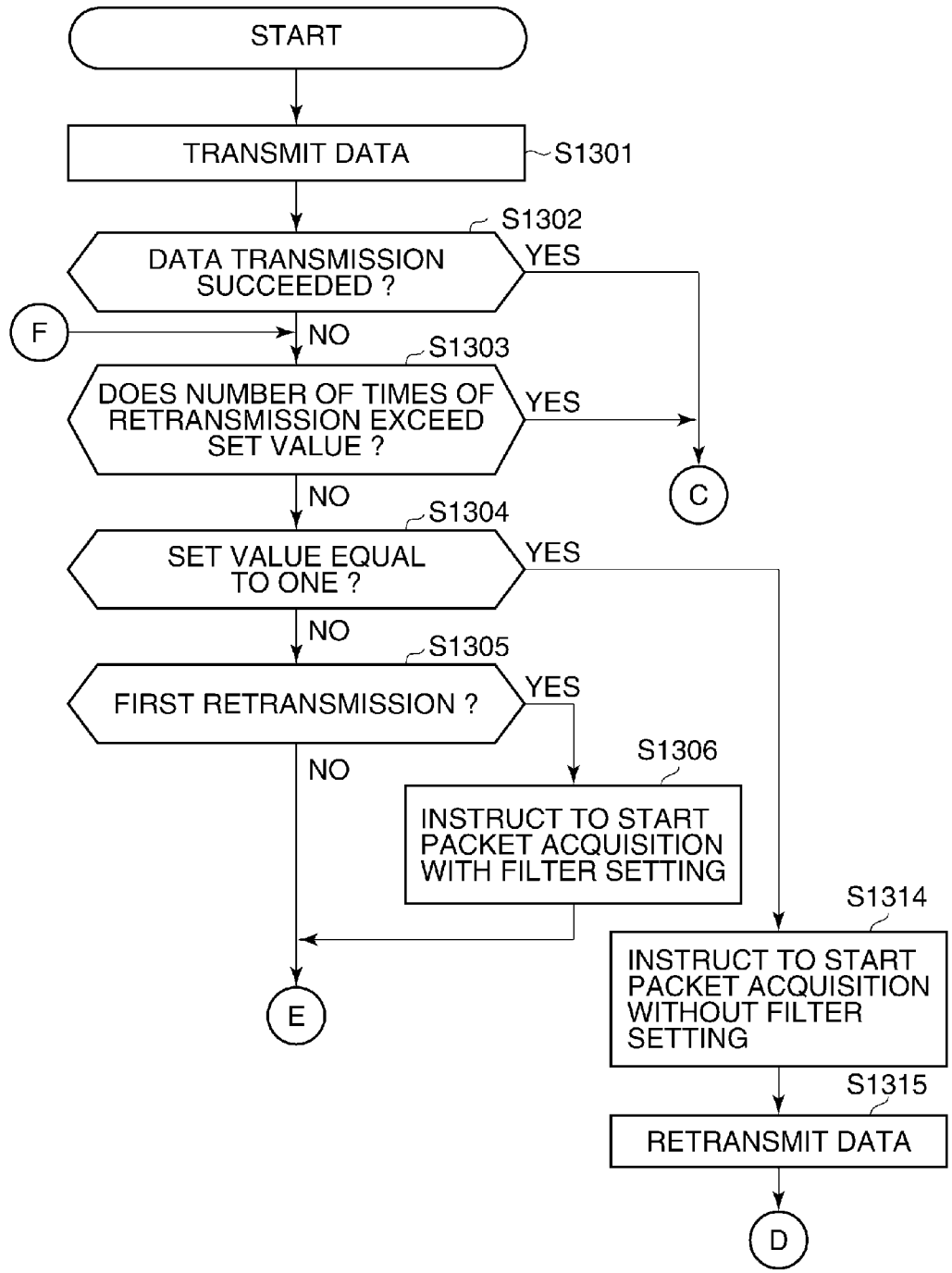
FIGS. 13A and 13B are flowchart showing a process performed by a data transmission control unit of an image forming apparatus according to a second embodiment of this invention.
Figure 13B:
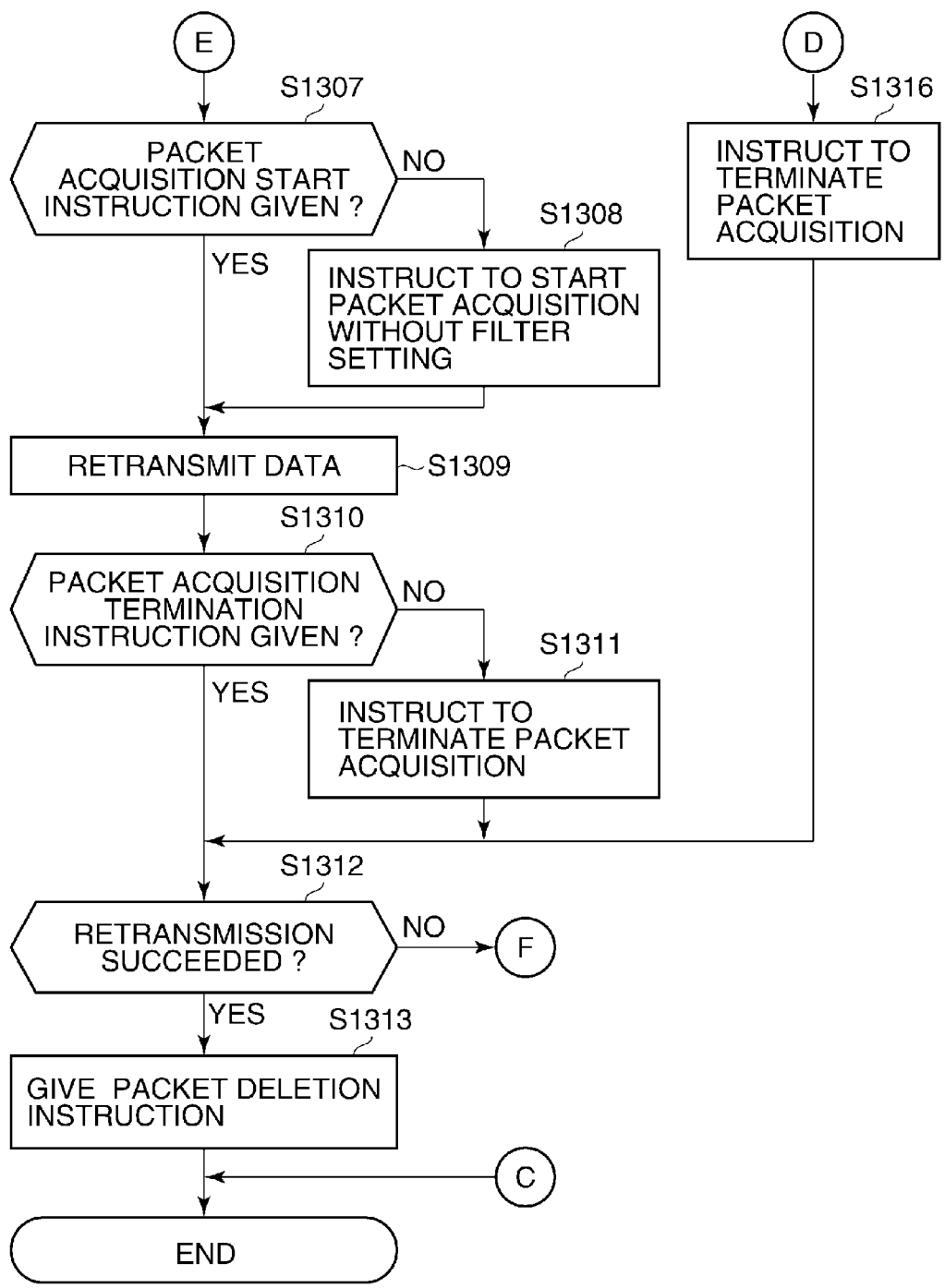

FIGS. 13A and 13B show in flowchart a process performed by the data transmission control unit 301 of the image forming apparatus according to the second embodiment.

As shown in FIG. 13A, the data transmission control unit 301 transmits image data to the host computer 102 (step S1301), and determines whether the image data transmission has succeeded (step S1302). If it is determined that the transmission has succeeded, the present process is completed. If the transmission has failed, the data transmission control unit 301 determines whether the number of times of retransmission performed until the present time exceeds a predetermined set value (a maximum possible number of times of retransmission) (step S1303).

If it is determined in step S1303 that the number of times of retransmission performed until the present time exceeds the set value, the present process is completed. If it is determined that the number of times of retransmission performed until the present time does not exceed the set value, the data transmission control unit 301 determines whether the set value of the number of times of retransmission is equal to 1 (step S1304). If the set value is not equal to 1 (i.e., equal to or larger than 2), the data transmission control unit 301 determines whether retransmission to be currently performed is a first retransmission (more generally, a predetermined N-th retransmission) (step S1305). If the answer to step S1305 is NO, the flow proceeds to step S1307 in FIG. 13B. If it is determined that the retransmission to be currently performed is the first retransmission, the data transmission control unit 301 instructs the packet acquisition control unit 303 to start packet acquisition with filter setting (step S1306), and then proceeds to step S1307.

In step S1307, the data transmission control unit 301 determines whether it has given a packet acquisition start instruction. If the answer to step S1307 is YES, the flow proceeds to step S1309. If the answer to step S1307 is NO, the data transmission control unit 301 instructs the packet acquisition control unit 303 to start packet acquisition without filter setting (step S1308), and then proceeds to step S1309. In step S1309, the data transmission control unit 301 retransmits image data to the host computer 102.

Next, the data transmission control unit 301 determines whether it has given a packet acquisition termination instruction during the current retransmission process (step S1310). If the answer to step S1310 is YES, the flow proceeds to step S1312. If the answer to step S1310 is NO, the data transmission control unit 301 instructs the packet acquisition control unit 303 to terminate the packet acquisition (step S1311), and proceeds to step S1312.

If it is determined in step S1304 that the set value of the number of times of retransmission is equal to 1, the data transmission control unit 301 instructs the packet acquisition control unit 303 to start the packet acquisition without filter setting (step S1314), and retransmits the image data to the host computer 102 (step S1315). Then, the data transmission control unit 301 instructs the packet acquisition control unit 303 to terminate the packet acquisition (step S1316), and proceeds to step S1312.

In step S1312, the data transmission control unit 301 determines whether the image data retransmission to the host computer 102 has succeeded. If the transmission has failed, the flow returns to step S1303. If the transmission has succeeded, the data transmission control unit 301 gives the packet acquisition control unit 303 a packet deletion instruction (step S1313), and completes the present process.

As described above, according to the second embodiment, it is possible to acquire communication packets at the time of data retransmission from the image forming apparatus to the host computer, whereby information useful for network failure analysis can efficiently be collected. In particular, in a case where data retransmission is performed once or a plural number of times, if the maximum possible number of times of retransmission is one or if there is a high possibility that a network failure has occurred, packet acquisition without filter setting is performed, whereby the retransmission process can be prevented from being completed without acquiring desired packets. Thus, information required to analyze the cause of network failure can sufficiently be collected.

Other Embodiments

The first and second embodiments have described cases in which image data is transmitted from an image forming apparatus as a data processing apparatus to an information processing apparatus (host computer) on a network. However, the present invention is not limited to image data transmission, but is also applicable to a data processing apparatus for transmitting data or information other than image data to an information processing apparatus. For example, the present invention can be applied to a data processing apparatus for periodically transmitting data processing-related information to an information processing apparatus by using a standard protocol such as DHCP (dynamic host configuration protocol) or SNIP (simple network time protocol).

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-181516, filed Aug. 4, 2009, which is hereby incorporated by reference herein in its entirety.

What is claimed is:

1. A data processing apparatus able to communicate with an information processing apparatus via a network, comprising:
    a retransmission unit configured to perform data retransmission in a case where data transmission to the information processing apparatus via the network has failed, wherein said retransmission unit performs the data retransmission by up to a predetermined number of times of retransmission;
    an acquisition unit configured to acquire packets flowing through the network in a case where said retransmission unit performs the data transmission; and
    a control unit configured to control said acquisition unit to acquire packets by not less than one and not greater than the predetermined number of times;
    wherein before said retransmission unit starts performing the data retransmission, said control unit gives said acquisition unit an instruction to start acquiring packets, and
    after said retransmission unit completes performing the data retransmission, said control unit gives said acquisition unit an instruction to terminate acquiring packets.

2. The data processing apparatus according to claim 1, further including:
    an instruction unit configured to accept a manual instruction according to which said instruction unit gives said acquisition unit an instruction to start or terminate acquiring packets,
    wherein the instructions given by said control unit to start and terminate acquiring packets are each processed preferentially to the instructions given by said instruction unit to start and terminate acquiring packets.

3. The data processing apparatus according to claim 1, further including:

a selection unit configured to select packet acquisition with filter setting in which filtering is applied during the packet acquisition or packet acquisition without filter setting in which the filtering is not applied during the packet acquisition, wherein said selection unit selects the packet acquisition with filter setting in a case where the data retransmission to be performed by said retransmission unit is any of a first to a predetermined N-th data retransmission, and said selection unit selects the packet acquisition without filter setting in a case where the data retransmission to be performed by said retransmission unit is any of (N+1)-th and subsequent data retransmissions.

4. The data processing apparatus according to claim 1, wherein the predetermined number of times is specified by a user.

5. The data processing apparatus according to claim 1, wherein said control unit controls said acquisition unit to acquire the packets in a case where said retransmission unit performs a first round of the data retransmission, and controls said acquisition unit not to acquire the packets in a case where said retransmission unit performs a second and subsequent rounds of the data transmission.

6. A control method for a data processing apparatus able to communicate with an information processing apparatus via a network, comprising:

a retransmission step of performing data retransmission in a case where data transmission to the information processing apparatus via the network has failed, wherein said retransmission step performs the data retransmission by up to a predetermined number of times of retransmission;

an acquisition step of acquiring packets flowing through the network in a case where said retransmission step performs the data transmission; and;

a control step of controlling said acquisition step to acquire packets by not less than one and not greater than the predetermined number of times;

wherein before said retransmission step starts performing the data retransmission, said control step gives said acquisition step an instruction to start acquiring packets, and after said retransmission step completes performing the data retransmission, said control step gives said acquisition step an instruction to terminate acquiring packets.

7. A non-transitory computer-readable storage medium storing a program for causing a computer to execute a control method for a data processing apparatus able to communicate with an information processing apparatus via a network, the control method comprising:

a retransmission step of performing data retransmission in a case where data transmission to the information processing apparatus via the network has failed, wherein said retransmission step performs the data retransmission by up to a predetermined number of times of retransmission;

an acquisition step of acquiring packets flowing through the network in a case where said retransmission step performs the data transmission; and;

a control step of controlling said acquisition step to acquire packets by not less than one and not greater than the predetermined number of times;

wherein before said retransmission step starts performing the data retransmission, said control step gives said acquisition step an instruction to start acquiring packets, and after said retransmission step completes performing the data retransmission, said control step gives said acquisition step an instruction to terminate acquiring packets.

* * * * *